US012528269B2

(12) United States Patent
Wang et al.

(10) Patent No.: US 12,528,269 B2
(45) Date of Patent: Jan. 20, 2026

(54) COMPOSITE FILM AND PRODUCTION METHOD THEREOF

(71) Applicant: Euro-Ace Composite Manufacturing Co., Ltd., Taichung (TW)

(72) Inventors: Shun-Tsao Wang, Taichung (TW); Ye-Long Cheng, Taichung (TW)

(73) Assignee: Euro-Ace Composite Manufacturing Co., Ltd., Taichung (TW)

( * ) Notice: Subject to any disclaimer, the term of this patent is extended or adjusted under 35 U.S.C. 154(b) by 536 days.

(21) Appl. No.: 17/969,113

(22) Filed: Oct. 19, 2022

(65) Prior Publication Data

US 2023/0150229 A1    May 18, 2023

(30) Foreign Application Priority Data

Oct. 22, 2021    (TW) .................................. 110139256

(51) Int. Cl.
*B32B 5/12*    (2006.01)
*B32B 5/06*    (2006.01)
(Continued)

(52) U.S. Cl.
CPC ................ *B32B 5/12* (2013.01); *B32B 5/073* (2021.05); *B32B 15/14* (2013.01); *B32B 37/003* (2013.01);
(Continued)

(58) Field of Classification Search
CPC ..... Y10T 428/24033; Y10T 428/24058; Y10T 428/24074; Y10T 428/24091; Y10T 428/24124; Y10T 428/24273; Y10T 428/24298; Y10T 428/24322; Y10T 428/24331; Y10T 428/31507;
(Continued)

(56) References Cited

U.S. PATENT DOCUMENTS

| 4,230,057 A | * | 10/1980 | Kurz ...................... | B32B 3/266 |
| | | | | 112/420 |
| 4,232,620 A | * | 11/1980 | Kurz ...................... | B29C 70/086 |
| | | | | 428/920 |
| 6,431,837 B1 | * | 8/2002 | Velicki .................. | F04D 29/324 |
| | | | | 416/223 R |

FOREIGN PATENT DOCUMENTS

CN    106515023 A  *  3/2017  ............. B29C 65/62

OTHER PUBLICATIONS

Machine translation (Google Patents) of CN 106515023 A. Translated Sep. 6, 2025. (Year: 2025).*

* cited by examiner

*Primary Examiner* — Maria V Ewald
*Assistant Examiner* — Ethan A. Utt
(74) *Attorney, Agent, or Firm* — Best & Flanagan LLP

(57) ABSTRACT

A composite film including stacking: a first fiber layer, a metal layer with multiple holes, and a second fiber layer, a stitching structure is arranged along the horizontal direction of the first fiber layer and the second fiber layer within areas of the holes of the metal layer; and the stitching structure in each of the holes is connected, but the stitching structures in different holes are not mutually connected. The stitching structures pass through the first and second fiber layers, fortifying the stress resistance of the composite film, thereby avoid the peeling of the stacked structure from the radial direction, and with the independent stitching structure formed independently in each of the holes of the metal layer, the stitching structures would not interact with each other, so that even if a stitching structure is broken, other stitching structures are not affected, increasing the durability of the product.

10 Claims, 3 Drawing Sheets

(51) Int. Cl.
  *B32B 15/14* (2006.01)
  *B32B 37/00* (2006.01)
  *B32B 38/00* (2006.01)

(52) U.S. Cl.
  CPC . *B32B 2038/0076* (2013.01); *B32B 2038/008* (2013.01); *B32B 2250/03* (2013.01); *B32B 2250/40* (2013.01); *B32B 2260/021* (2013.01); *B32B 2260/046* (2013.01); *B32B 2305/10* (2013.01); *B32B 2305/72* (2013.01)

(58) Field of Classification Search
  CPC ..... Y10T 428/31511; Y10T 428/31529; Y10T 428/31551; Y10T 428/31605; Y10T 428/31678; Y10T 428/31681; Y10T 428/31688; Y10T 428/31692; B32B 3/26; B32B 3/266; B32B 5/00; B32B 5/02; B32B 5/022; B32B 5/024; B32B 5/06; B32B 5/073; B32B 5/12; B32B 5/22; B32B 5/24; B32B 5/26; B32B 5/262; B32B 5/263; B32B 5/265; B32B 5/266; B32B 5/275; B32B 5/277; B32B 5/28; B32B 7/00; B32B 7/04; B32B 7/08; B32B 7/09; B32B 15/00; B32B 15/04; B32B 15/08; B32B 15/085; B32B 15/088; B32B 15/092; B32B 15/095; B32B 15/14; B32B 15/18; B32B 15/20; B32B 2260/02; B32B 2260/021; B32B 2260/023; B32B 2260/04; B32B 2260/046; B32B 2262/00; B32B 2262/02; B32B 2262/0261; B32B 2262/0269; B32B 2262/10; B32B 2262/101; B32B 2262/105; B32B 2262/106; B32B 2305/10; B32B 2305/07; B32B 2305/076; B32B 2305/18; B32B 2305/188
  USPC ....... 428/102, 105, 107, 109, 113, 131, 134, 428/137, 138, 412, 413, 418, 423.1, 428/425.8, 426, 432, 433, 457, 458, 460, 428/461
  See application file for complete search history.

COMPOSITE FILM AND PRODUCTION METHOD THEREOF

FIELD OF INVENTION

A composite film, especially to a composite film with stacked heterogeneous materials and strength enhancement.

BACKGROUND OF THE INVENTION

Common composite films are manufactured by steps of impregnating fiber cloths with a resin and then curing the resin, wherein the pre-preg fiber cloths can be stacked or cut into shapes needed. After the pre-preg fiber cloths stacked as needed, subsequent processing and forming can be done according to the thermosetting or thermoplastic characteristics of the resins.

Nevertheless, common composite films have greater stress resistant abilities along the axial direction of the fibers and very poor stress resistant abilities along the radial direction of the fibers. Therefore, when pre-preg fiber cloths stacked as needed, the composite films can have greater stress resistant abilities along the two-dimensional directions (e.g., the directions of the X axis and Y axis) and very poor stress resistant abilities along the stacking direction (e.g., the direction of the Z axis).

For example, common composite films can have greater tensile strength along the two-dimensional directions, and when external forces (e.g., impact or bend) are applied along the stacking direction on the composite films, the composite films are peeled off from the laminated structure of the pre-preg fiber cloths. Furthermore, when the laminated structure is peeled off, the stress resistant abilities of each direction decrease significantly, and the fibers of the peeled part of the laminated structure of the composite films might break and cause the breakage of the composite films.

In addition, common composite films comprise many fibers that can provide transmission routes to disperse stresses through the axial directions of the fibers, so composite films can have greater stress resistant abilities along the axial direction of the fibers. Nonetheless, when a portion of the fibers in the composite films break, since the broken fibers cannot disperse stresses, the unbroken fibers have to bear all the stresses. Therefore, the unbroken fibers are overloaded and gradually broken down to cause a part of the composite films to break down entirely.

Therefore, a novel composite film and the manufacturing methods of the novel composite film is required to solve the peeling-off of the laminated layers and the transferring effect of broken fibers of conventional composite film.

SUMMARY OF THE INVENTION

In order to solve the aforementioned problems of conventional composite films, the present invention provides a composite film comprising sequentially stacked: a first fiber layer, a metal layer with several holes, and a second fiber layer, wherein: a stitching structure is arranged along a horizontal direction of the first fiber layer and the second fiber layer within areas of the holes of the metal layer, the stitching structure in each of the holes is connected, but the stitching structures in different holes are not mutually connected, and the first fiber layer and the second fiber layer are tightly fastened together and fall into the holes.

Wherein, the first fiber layer or the second fiber layer comprises a single layer of fiber cloth or multiple layers of fiber cloths, wherein said fiber cloth is unidirectional fabric, woven fabric, or pre-preg fabric impregnated with a resin, wherein said fiber cloth comprises carbon fibers, glass fibers, Kevlar fibers, ceramic fibers, or combinations thereof.

Wherein, the resin comprises epoxy resins, thermoplastic polyurethane, polycarbonate, polyetheretherketone, polypropylene, or combinations thereof.

Wherein, when the first fiber layer or the second fiber layer comprises multiple layers of fiber cloths, the fiber cloths are stacked together with different fiber orientation.

Wherein, the stitching structure comprises Kevlar thread or metal thread.

Further, this invention also provides a production method of the aforementioned composite film, comprising steps of: stacking a first fiber layer, a metal layer with several holes, and a second fiber layer in sequence; sewing stitching structures along the horizontal direction of the first fiber layer and the second fiber layer within the areas of the holes of the metal layer to make the first fiber layer, the metal layer, and the second fiber layer fastened together, wherein each of the stitching structures sewed in each of the holes is connected, but the stitching structure is not connected with other stitching structures in other holes; and curing the first fiber layer, the metal layer, and the second fiber layer that are stacked and fastened to make the first fiber layer and the second fiber layer align with the positions of the holes of the metal layer, and the first fiber layer and the second fiber layer are tightly fastened together and fall into the holes.

Wherein, further processing and shaping the composite film to form a finished product.

Wherein, rolling process is applied to remove bubbles between the first fiber layer, the metal layer, and the second fiber layer during the step of curing.

As above description, the present invention has beneficial effects and advantages as following:

1. The stitching structures of this invention extend through the first fiber layer and the second fiber layer to fortify the stress resistant abilities along the radial direction of the composite film, and thus the peeling off of the stacked structure from the radial direction is avoided. At the same time, with the independent stitching structure formed independently in each of the holes of the metal layer, the stitching structures would not interact with each other. Accordingly, even one of the stitching structures is broken, other stitching structures would not be affected, effectively increasing the durability of the product of this invention.

3. The stitching structures do not need to penetrate the metal layer, so the stitching structures are essentially sewed through the first fiber layer and the second fiber layer. Hence, the strength of the heterogeneous plate can be increased by increasing the thickness of the metal layer of this invention, the total thickness of the plate and the application ranges of this invention are simultaneously increased.

BRIEF DESCRIPTION OF THE DRAWINGS

The steps and the technical means adopted by the present invention to achieve the above and other objects can be best understood by referring to the following detailed description of the embodiments and the accompanying drawings. These embodiments are not restrictive, and in these embodiments, same numberings indicate same structures, wherein.

DETAILED DESCRIPTION OF THE PREFERRED EMBODIMENTS

Figure 1:
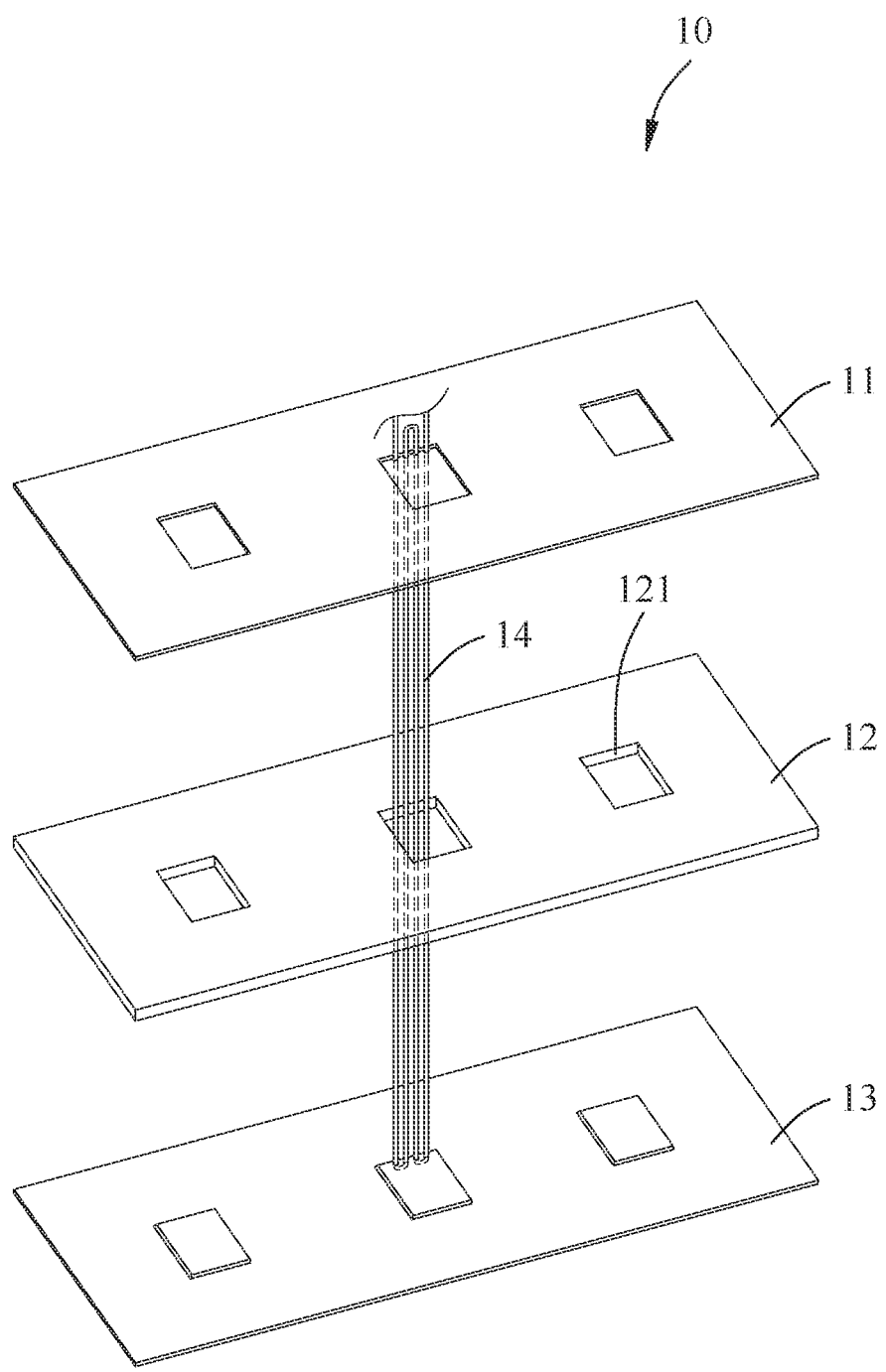
FIG. 1 is an exploded view of an embodiment of a composite film in accordance with the present invention.

Reference will now be made in detail to the present preferred embodiments of the invention, examples of which are illustrated in the accompanying drawings. Wherever possible, the same reference numbers are used in the drawings and the description to refer to the same or like parts. It is not intended to limit the method by the exemplary embodiments described herein. In the following detailed description, for purposes of explanation, numerous specific details are set forth in order to attain a thorough understanding of the disclosed embodiments. It will be apparent, however, that one or more embodiments may be practiced without these specific details. As used in the description herein and throughout the claims that follow, the meaning of "a", "an", and "the" may include reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to.

Preferred Embodiments of Composite Films

Figure 2:
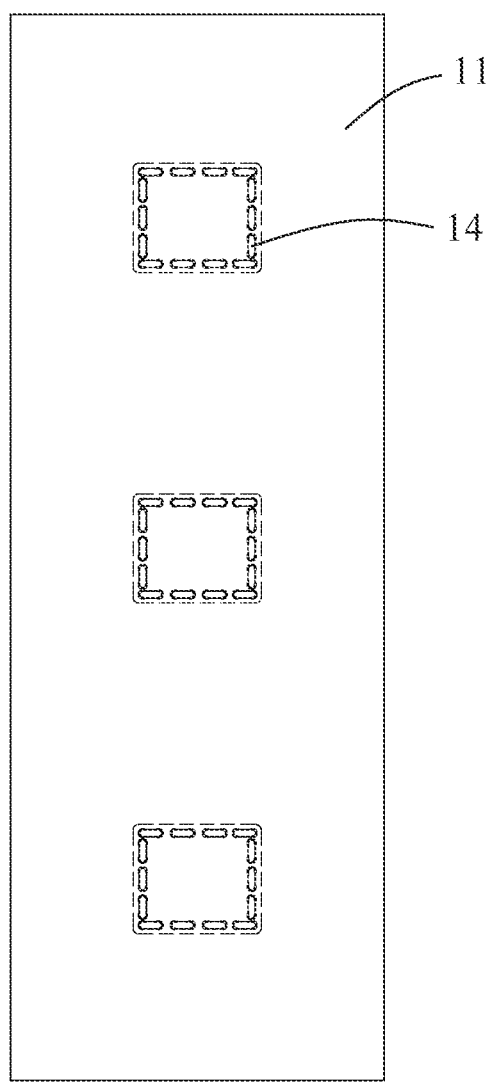
FIG. 2 is a schematic diagram of an embodiment of a composite film in accordance with the present invention.

With reference to FIG. 1 and FIG. 2, a first preferred embodiment of a composite film 10 in accordance with the present invention includes: a first fiber layer 11, a metal layer 12 with multiple holes 121, and a second fiber layer 13, wherein: a stitching structure 14 is arranged along the horizontal direction of the first fiber layer 11 and the second fiber layer 13 within the hole 121 area of the metal layer 12; and the stitching structures 14 in each hole 121 are connected, but the stitching structures 14 in different holes 121 are not mutually connected, and the first fiber layer and the second fiber layer 13 are tightly fastened together and fall into the holes 121.

Wherein, the first fiber layer 11 and the second fiber layer 13 in this embodiment are primarily unidirectional fabric or woven fabric comprising carbon fibers, glass fibers, Kevlar fibers, ceramic fibers, or a combination thereof. Preferably, the unidirectional fabric or the woven fabric is pre-preg fiber cloth comprises aforementioned fibers impregnated with a resin, wherein the resin comprises epoxy resins, thermoplastic polyurethane, polycarbonate, polyetheretherketone, polypropylene, or a combination thereof. The first fiber layer 11 or the second fiber layer 13 can be made up of a single layer of fiber cloth or multiple layers of fiber cloths, and when the first fiber layer 11 or the second fiber layer 13 is made up of multiple layers of fiber cloths, each of the fiber cloths can be stacked with different fiber orientation angle to each other fiber cloths as needed, and the fiber orientation angle between two of the fiber cloths includes but not limit to 0 degree, 45 degree, 90 degree. In practice, the stacking angle of the first fiber layer 11 or the second fiber layer 13 can be adjust to any arbitrary angle as needed, or the first fiber layer 11 or the second fiber layer 13 can be weaved in advanced at specific interweaving angle of the fibers as needed. The stitching structure 14 can include but not limit to Kevlar thread or metal thread.

The metal layer 12 is preferably a metal plate with several holes 121, and the shapes of the holes 121 are not restricted. In the embodiment, the holes shown are rectangular with dimensions of 1 cm*1 cm, and each of the stitching structures 14 is arranged in one of the holes 121, and the stitching structure 14 is not connected with other stitching structures 14 in other holes 121.

Preferred Embodiment of the Production Method

Figure 3:
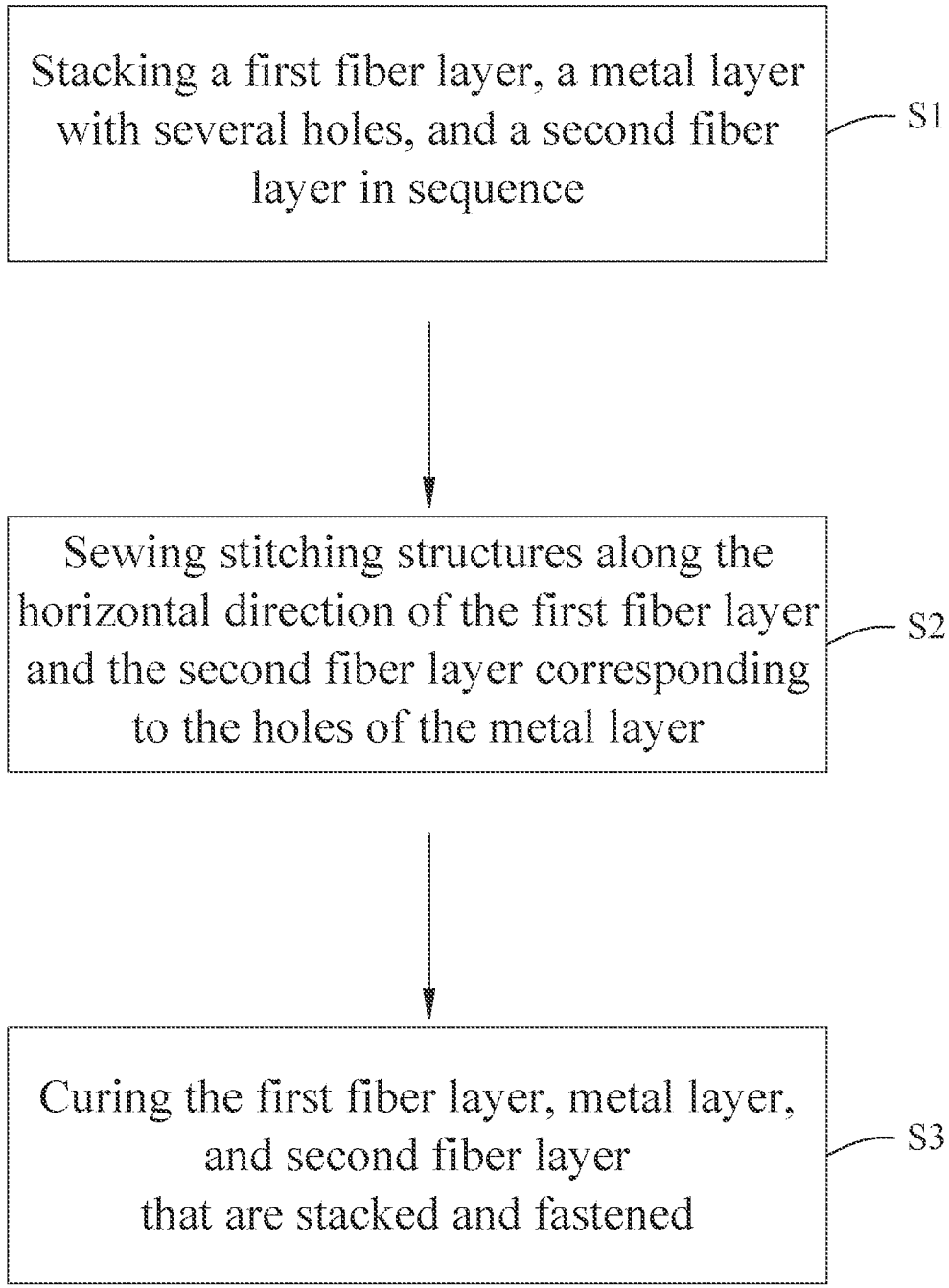
FIG. 3 is a block diagram of a production method for a composite film in accordance with the present invention.

With reference to FIG. 3, the preferred embodiment of the production method of the aforementioned composite film 10 in accordance with the present invention comprises steps of:

Step S1: stacking the first fiber layer 11, the metal layer 12 with several holes 121, and the second fiber layer 13 in sequence;

Step S2: sewing stitching structures 14 along the horizontal direction of the first fiber layer 11 and the second fiber layer 13 in the areas of the holes 121 of the metal layer 12 to make the first fiber layer 11, the metal layer 12, and the second fiber layer 13 fastened together, wherein each of the stitching structures 14 sewed in each of the holes 121 is connected with other in the hole 121, but the stitching structure 14 is not connected with other stitching structures 14 in other holes 121; and Step S3: curing the first fiber layer 11, the metal layer 12, and the second fiber layer 13 that are stacked and fastened to form the composite film 10 in accordance with the present invention, wherein at the hole 121 area of the metal layer 12, the first fiber layer 11 and the second fiber layer 13 are tightly fastened together and fall into the holes 121.

Step S4 (optional, not shown in the figure): further processing and shaping the composite film 10 to form a finished product.

In the preferred embodiments of this present invention, the sewing process to form the stitching structure 14 to the stacked first fiber layer 11 and the second fiber layer 13 is before the curing of the first fiber layer 11 and the second fiber layer 13; that is, when the first fiber layer 11 and the second fiber layer 13 are still soft, the stitching structure 14 could be sewed through the first fiber layer 11 and the second fiber layer 13.

In other preferred embodiments of this present invention, when the first fiber layer 11 or the second fiber layer 13 contains multiple layers with a resin, curing can be done on each of the layers separately and adhere them together later, or the layers can be cured together. When the first fiber layer 11 and the second fiber layer 13 are cured separately and adhere together later, a resin adhesive layer (not shown in figures) can be applied between the multiple layers of the first fiber layer 11 or the second fiber layer 13 to adhere multiple layers of the fiber cloths.

Further, in the preferred embodiments of this present invention, to avoid the adhesive resin contains bubbles and causes the adhesion between the multiple layers of the first fiber layer 11 or the second fiber layer 13 to be insecure or peeled off after the composite film 10 is cured and formed, the bubbles of the resin can be removed with rolling process during manufacturing to improve the adhesiveness between layers. In another embodiment of the present invention, bubbles can also be removed by vacuumizing the resin.

In the structural design of the embodiments of this present invention, by the stitching structures 14 penetrating through the first fiber layer 11 and the second fiber layer 13, the stress resistant abilities along the radial direction of the composite film 10 is fortified, and thus avoid the peeling off of the stacked structure from the radial direction. At the same time, with the independent stitching structure 14 formed independently in each of the holes 121 of the metal layer 12, the stitching structures 14 would not interact with each other, so that even one of the stitching structure 14 is broken, other stitching structures 14 would not be affected, effectively increasing the durability of the product of this invention.

Furthermore, although the stitching structures 14 penetrate through the metal layer 12, the stitching structures 14 are essentially sewed through the first fiber layer 11 and the second fiber layer 13. Hence, the strength of the heterogeneous plate can be increased by increasing the thickness of the metal layer 12 of this invention.

It should be noted that in order to simplify the expression of the technology disclosed in the present invention for better understanding of one or more embodiments of the invention, in the foregoing description of the embodiments of the invention, sometimes multiple features are combined into one embodiment, drawings or descriptions thereof. However, this way of disclosure does not mean that the claimed object of the present invention requires more features than those mentioned in the examples. In fact, claimed features may be less than all features of a single foregoing disclosed embodiment without reducing the effects of the invention.

In some embodiments, numbers describing components and attribute quantities are used. It should be understood that such numbers used in the description of embodiments use words "around", "approximately" or "about" in some examples. Unless otherwise stated, "around", "approximately" or "about" indicates that the stated figure allows for a variation of ±20%. Accordingly, in some embodiments, the numerical parameters used in the specification and claims are approximations that may vary depending upon the desired characteristics of individual embodiments. In some embodiments, numerical parameters should take into account the specified significant digits and adopt the general digit reservation method. Although the numerical ranges and parameters used to demonstrate the breadth of scope in some embodiments of the invention are approximations, in specific embodiments such numerical values are as precisely as practicable.

The above specification, examples, and data provide a complete description of the present disclosure and use of exemplary embodiments. Although various embodiments of the present disclosure have been described above with a certain degree of particularity, or with reference to one or more individual embodiments, those with ordinary skill in the art could make numerous alterations or modifications to the disclosed embodiments without departing from the spirit or scope of this disclosure.

DESCRIPTION OF SYMBOLS 10 composite film
11 first fiber layer
12 metal layer
121 hole
13 second fiber layer
14 stitching structure

What is claimed is:

1. A composite film comprising sequentially stacked:
   a first fiber layer;
   a metal layer with multiple holes; and
   a second fiber layer; wherein:
   a stitching structure is arranged along the horizontal direction of the first fiber layer and the second fiber layer within areas of the holes of the metal layer; and
   the stitching structures in each of the holes are connected, but the stitching structures in different holes are free from being mutually connected, and the first fiber layer and the second fiber layer are tightly fastened together and fall into the holes.

2. The composite film of claim 1, wherein the first fiber layer or the second fiber layer comprises a single layer of fiber cloth or multiple layers of fiber cloths, wherein said fiber cloth is unidirectional fabric, woven fabric, or pre-preg fabric impregnated with a resin, wherein said fiber cloth comprises carbon fibers, glass fibers, Kevlar fibers, ceramic fibers, or combinations thereof.

3. The composite film of claim 2, wherein
   the resin comprises epoxy resins, thermoplastic polyurethane, polycarbonate, polyetheretherketone, polypropylene, or combinations thereof.

4. The composite film of claim 2, wherein
   when the first fiber layer or the second fiber layer comprises multiple layers of fiber cloths, the fiber cloths are stacked together with different fiber orientation.

5. The composite film of claim 3, wherein:
   when the first fiber layer or the second fiber layer comprises multiple layers of fiber cloths, the fiber cloths are stacked together with different fiber orientation.

6. The composite film of claim 1, wherein
   the stitching structure comprises Kevlar thread or metal thread.

7. A production method of a composite film comprising steps of:
   stacking a first fiber layer, a metal layer with multiple holes, and a second fiber layer in sequence;
   sewing stitching structures along the horizontal direction of the first fiber layer and the second fiber layer within the areas of the holes of the metal layer to make the first fiber layer, the metal layer, and the second fiber layer fastened together, wherein each of the stitching structures sewed in each of the holes are connected, but the stitching structure in each one of the holes is free from being connected with other stitching structures in other holes; and
   curing the first fiber layer, the metal layer, and the second fiber layer that are stacked and fastened to make the first fiber layer and the second fiber layer correspond to the holes of the metal layer in position, and the first fiber layer and the second fiber layer are tightly fastened together and fall into the holes.

8. The production method of a composite film of claim 7, wherein further processing and shaping are applied to the composite film to form a finished product.

9. The production method of a composite film of claim 7, wherein a rolling process is applied to remove bubbles between the first fiber layer, the metal layer, and the second fiber layer during the step of curing.

10. The production method of a composite film of claim 8, wherein a rolling process is applied to remove bubbles between the first fiber layer, the metal layer, and the second fiber layer during the step of curing.

* * * * *